Nov. 23, 1965 V. F. ZAHODIAKIN 3,219,087
RESILIENT RELEASABLE MECHANISM
Filed May 20, 1963 2 Sheets-Sheet 1
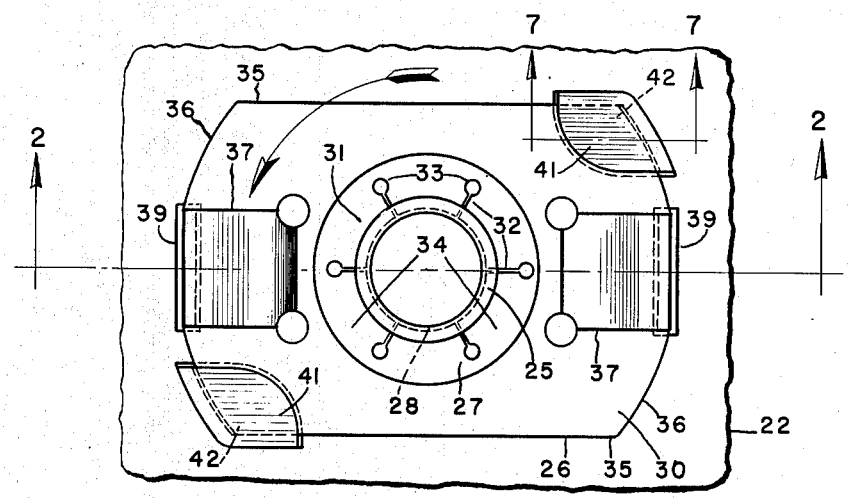
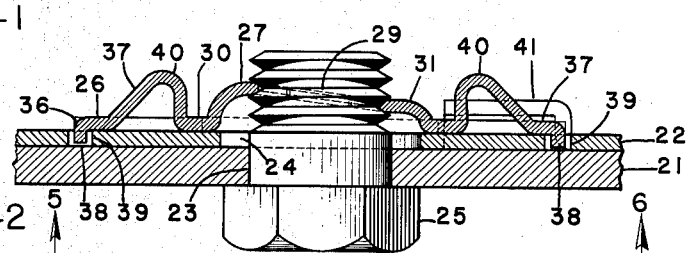
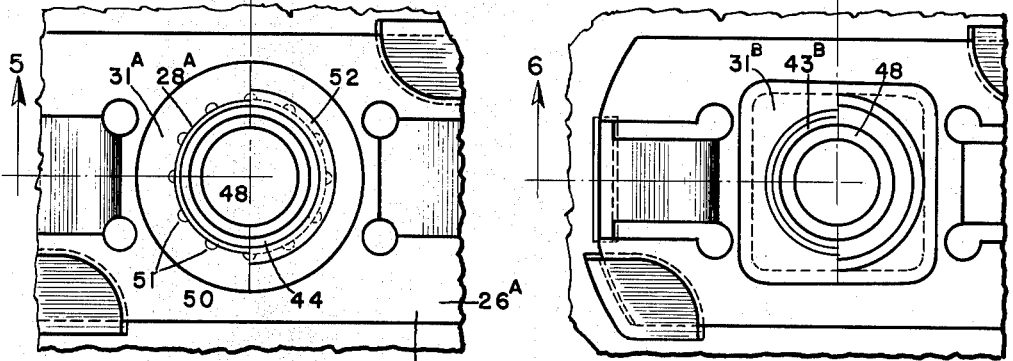
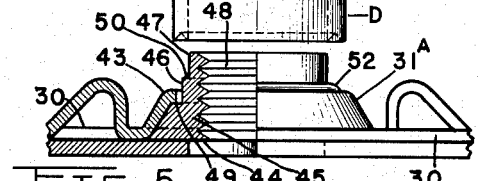
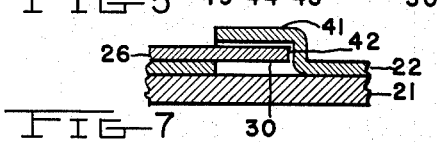
INVENTOR.
VICTOR F. ZAHODIAKIN
BY
Howard P. King
ATTORNEY Nov. 23, 1965  V. F. ZAHODIAKIN  3,219,087
RESILIENT RELEASABLE MECHANISM
Filed May 20, 1963  2 Sheets-Sheet 2
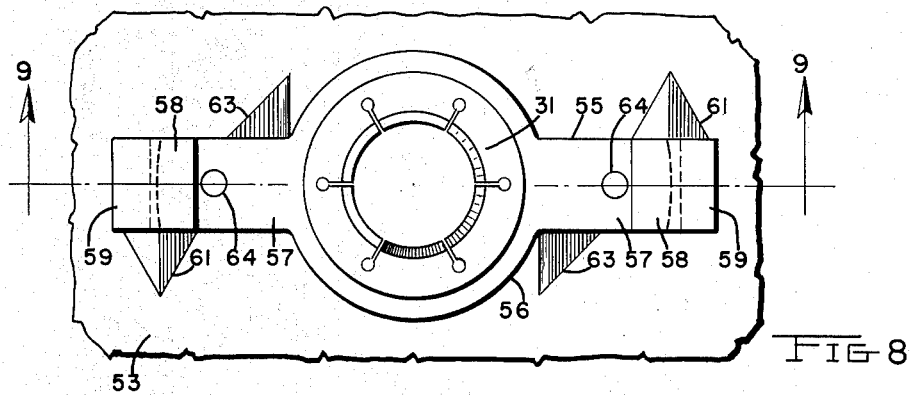
INVENTOR.
VICTOR F. ZAHODIAKIN
BY
Howard P. King
ATTORNEY

United States Patent Office 3,219,087
Patented Nov. 23, 1965

3,219,087
RESILIENT RELEASABLE MECHANISM
Victor F. Zahodiakin, P.O. Box 689, Summit, N.J.
Filed May 20, 1963, Ser. No. 281,619
7 Claims. (Cl. 151—41.75)

This invention relates to releasably secured mounting mechanism having a variety of utilitarian purposes, such as for receiving a conventional bolt or threaded post or any other means accomplishing releasable attachment of two or more members. While the invention may be used, for instance, for such purposes as retaining a post of a clothes tree, or securing a flagstaff, holding a curtain rod, and for various other purposes too numerous to catalog herein, the mechanism, for purposes of this disclosure, is arbitrarily illustrated in performing the function of a releasable receptacle which is threaded and used for receiving a common bolt attaching or securing a plurality of members, such as panels, in juxtaposition.

The problem solved by the present invention is the provision of a receptacle that is retained from inadvertent escape from its appointed location, but which can be readily released and replaced at the option of the user. In the past, receptacles functioning in the capacity of internally threaded nuts, have been sometimes rivetted and sometimes welded in place, and if the threads become stripped or damaged, it becomes a major operation to remove and replace the receptacle, and the present invention entirely eliminates such an obstacle.

In its broad aspect, therefore, the invention proposes a securely held but readily releasable receptacle as a mounting mechanism.

Otherwise expressed, the invention provides a mounting mechanism which is detachably yet positively flush-mounted on and in juxtaposition to a member and retained in its appointed place without rivets, screws, lock-washers, pins, welds, adhesives or the like, so as to avoid permanent attachment such that removal would introduce a probability of disruption either of the member or of the mounting mechanism in whole or in part.

A consideration of the invention is provision of a mechanism of detachable character which will not become inadvertently detached due to any causes involved in use, such as intense high frequency vibration, fatigue, impact, twist, extraneous forces, and so forth.

The invention further proposes a mechanism which is extremely strong, resistant to tension, compression, shear and torque stresses.

The invention seeks and attains a simple and readily operable construction both economical to manufacture and in use, not only on initial installation, but also when removal and/or substitution are required, and without limit to how often removal and/or interchange may be performed.

An outstanding feature of this invention is that there is only one single part required, the structure whereof incorporates all necessary functions needed to receive a threaded bolt or other object releasably detachable, and itself constituted as a releasably detachable means applicable to a supporting member, said single part being of a character adapted to be manufactured at low cost with extreme speed completing the said part by a single stroke of a press.

Essential amongst the important objects of the invention is provision of a structure capable of fabrication from resilient sheet steel hardened to maintain its strength and resiliently and adequately thin so that it may be flexed by hand in the lengths utilized and intended to be flexed.

In greater detail, the invention utilizes integral segments of the spring steel of appropriate shape and thickness to engage helically in the threads of a bolt or the like to permit screwing the bolt or the like into or out of the same.

Furthermore, the mechanism is constructed to enable the receptacle to be applied in its appointed place by a simple twist under manual pressure, and removal by a reverse twist and lifting force.

Scope of the invention is extended to utilization of a rigid threaded element or nut permanently incorporated in the resilient portion or element of the receptacle.

The invention provides for means to prevent escape of the receptacle from the member on which it is mounted, either in a direction perpendicular to such member or in any lateral direction.

Important amongst the objects of the invention is provision of simple and effective interlocking of said receptacle with its supporting member by which the receptacle is restrained from twisting inadvertently from its appointed location of use.

Again, the invention proposes utilization of the resilient flexing of the receptacle to accommodate introduction of the interlocking means to its effective position and to permit manual release from such position.

Other objects, advantages and beneficial structural features will appear to persons skilled in the art to which the invention appertains, as the description proceeds, both by direct recitation thereof and by implication from the context.

The novel features that I consider characteristic of my invention are set forth in the appended claims. The invention itself, however, as to its construction in several forms, and its method of operation, together with additional objects and advantages, will be best understood from the following description of certain specific embodiments when read in conjunction with the accompanying drawings, in which FIGURE 1 is a plan of the invention in position of use on a panel or basal member;

FIGURE 2 is a longitudinal sectional view taken on line 2—2 of FIG. 1;

FIGURE 3 is another plan of the invention, but showing a two-piece receptacle at the left of a vertical diameter of which the parts are shown before crimping, and at the right side showing the parts after crimping for unifying the parts as the completed receptacle;

FIGURE 4 is a plan of another modified two-piece receptacle, similarly showing at the left the assembly before crimping and at the right after crimping;

FIGURE 5 is a sectional elevation taken on line 5—5 of FIG. 3;

FIGURE 6 is a sectional elevation taken on line 6—6 of FIG. 4;

FIGURE 7 is a detail sectional view taken on line 7—7 of FIG. 1;

FIGURE 8 is a plan of a modified construction from the construction of FIG. 1;

FIGURE 9 is a sectional view taken on line 9—9 of FIG. 8;

FIGURE 10 is a plan of another modified construction;

FIGURE 11 is a sectional view taken on line 11—11 of FIG. 10;

FIGURE 12 is a sectional view corresponding to FIG. 11, but showing a modified construction of interlock;

FIGURE 13 is a detail cross-section on line 13—13 of FIG. 12; and

FIGURE 14 is a detail cross-section on line 14—14 of FIG. 11.

In the specific embodiment of the invention illustrated in said drawings, and giving attention initially to FIGS. 1 and 2, the invention has been arbitrarily there shown as involved in the clamping of two panels or members 21, 22 flatwise together. Said members are shown as having axially coincident or registering holes 23, 24 respectively therethrough for reception of the shank of a bolt 25, and in the particular orientation here selected, the head of the bolt engages against the under face of the lower member 21 and the shank of the bolt protrudes upwardly through the upper member 22. As indicated above, this is an arbitrarily selected showing of one use of the invention, and is not to be understood as restrictive. In any event, the invention provides a receptacle 26 adapted to be superposed upon and removably mounted on the upper one of said members for interlocking therewith proximate to the hole 24 thereof, and since it is the upper member 22 upon which the receptacle is removably mounted, it will be designated hereinafter in its individual capacity by the more general term of basal member 22 so as to avoid any implication that the lower member 21 must be present for all uses to which the invention is applicable.

In the specific embodiment of the invention illustrated in FIGS. 1 and 2, a central portion of said receptacle 26 constitutes a socket 27 as an integral portion of the receptacle, said socket having a circular opening or crater 28 therethrough adapted to be located coaxially to the hole 24 of basal member 22. Said crater is internally formed with a helical thread 29 for engagement with the screw threads of the bolt 25. Said receptacle 26 is formed or stamped from relatively thin sheet spring steel, thin enough to be flexed by hand, and tempered to generate and maintain resiliency, it being formed into its ultimate shape by a single blow of an appropriate punch and die. Spaced radially outwardly from the center hole or crater 28 of the receptacle, the metal remains flat for much of its area and functions as the seating body portion 30 of the receptacle since in practice it is juxtaposed flatwise upon and exerts pressure against the upper flat surface of the basal member 22 marginally and beyond the aforementioned hole 24 of said basal member.

The circular portion of the receptacle 26 intervening between said body 30 and crater 28, bulges upwardly inwardly as a rosette 31 with appropriate shape, which in this instance provides an inwardly directed helical edge, appropriately beveled to constitute it the aforementioned helical thread 29 forming the inner periphery of the said crater 28. It will be appreciated that said inner periphery of the crater constituting helical thread 29 is of less diameter than the hole 24 in the basal member 22 which it overlies and is of proper diameter to engage the bolt threads. By virtue of the rosette shape of the portion of the receptacle surrounding the crater, said helical thread 29 is spaced at a distance above the basal member 22 in use and is correspondingly above the planar under face of the receptacle body or seat 30. Said rosette 31 is provided with a circular series of radially directed slits 32 extending outwardly from the crater 28, the outward ends of said slits terminating as circular perforations 33 for preventing the metal from splitting or cracking in continuation of the slits during use. The slits 32 divide the rosette 31 into a circular series of inwardly directed tongues or segments 34 adapted to individually flex and exert gripping engagement with the bolt threads as the bolt is screwed home.

The contour of the receptacle body 30 is shown as providing two long straight-line edges 35, 35 parallel to each other and equi-distant from the axis of crater 28, and as providing two arcuate end edges 36, 36 the center of curvature for each of which is coincident with said axis. The said radius of each end edge of body 30 is considerably greater than the perpendicular distance of each straight edge 35 from said axis, giving an elongated configuration to the receptacle viewed in plan. Resilient legs 37, integral at one end of each thereof proximate to the rosette 31, are formed intermediate of the straight edges 35, 35, parallel thereto, and have their free ends proximate to the said arcuate end edges 36, 36 the continuity whereof is interrupted by the cut-out produced in formation of said legs. The primary purpose of said resilient legs is to perform the function of latches, and for that purpose the remote ends thereof are bent downwardly forming toes 38 the vertical dimension of which approximately equals the thickness of the basal member 22. Said basal member is provided with appropriate apertures or ports 39 at locations adapted to register with said toes and function as keepers or detents to receive and confine said toes which will snap thereinto when brought into registration therewith. Each said keeper aperture or port 39 is of a size and shape to desirably conform to the length and thickness of said toe 38 with adequate clearance to assure entry of the toe thereinto, and in event the receptacle is intended to be "floating," the said keeper aperture or port is given the necessary increase in size to meet the requirements. As an assistance in effecting entry of the toe latch 38 into the keeper aperture or port 39, the leg 37 may be formed with a knee bend 40 between the said toe and the other end of the leg which will enable the toe not only to move perpendicular to the basal member 22, but will permit a flexure varying the effective length of the leg to move the toe in a direction of the elongation of said receptacle to aid finding of the port by the toe and entry of the toe into that port.

From the above it will now be recognized that means have been provided for positioning the receptacle with its crater 28 in substantial registration with the bolt hole 24 in basal member 22, and with the latch toes 38 in their respective keeper apertures or ports 39, displacement of the receptacle 26 will be restrained in all lateral directions.

Movement of the receptacle 26 upwardly from said basal member 22 is prevented by means of pockets or other retainers 41 stamped up from said basal member 22 at appropriate locations. As shown in FIGS. 1 to 7 inclusive, said retainers are at locations to receive diagonally opposite corners 42 of the receptacle body 30, which in this instance may be twisted counter-clockwise to introduce those corners into said pocket retainers, and twisted clockwise for withdrawing the corners from said pocket retainers. It is to be noted, however, that since the latch toes 38 normally project below the plane of the under face of the receptacle body 30, the corners 42 of the receptacle body approaching the pockets or retainers 41 during assembly operation, have to be depressed into engagement with the top surface of said basal member 22 for introduction of said corners into said pockets. This introduction of said corners 42 into the pockets may be readily accomplished by upwardly flexing the resilient legs 37 and thereby permit said body 30 to be depressed into flatwise engagement with the upper surface of basal member 22 which results in said corners 42 being lowered to a level at which they may be slid under the retainers 41. In order to release and remove the receptacle 26 from basal member 22, the legs 37 may be lifted to withdraw toes 38 thereof from keeper apertures or ports 39 and the receptacle then twisted free of the retainer pockets. A suitable tool may be provided for effecting both the assembly and disassembly operations, and the knee bends 40 will be found convenient for receiving lifters provided by the tool to obtain lifting disengagement of the latch toes from the keeper apertures, whereupon the tool is further employed to rotate the receptacle away from the retainers 41.

As there is considerable conformity between the structure shown in FIGS. 3 to 6 with that shown in FIGS. 1, 2 and 7, as indicated in the preceding paragraph, the same reference numerals are applied to similar, although not necessarily identical parts. Mentionable differences in structure as shown in FIGS. 3 and 5, include the facts that crater 28$^a$ is of greater diameter, rosette 31$^a$ has no slits, is not helical but has its upper inwardly directed edge in a plane parallel to body portion 30, and said rosette has a more pronounced frusto-conical contour at the upper smaller end of which said inwardly directed edge 43 is formed. These differences are made in the interest of providing more substantial thread engagement for the bolt when introduced into the modified receptacle 26$^a$. This modified receptacle, prior to unification, is a two-piece construction, but is unified at the time of manufacture into a one-piece receptacle comprising an internally threaded nut 44 permanently secured within the rosette 31ª.

Said nut 44 has a frusto-conical plinth 45 conforming in size and shape to the interior of the rosette 31ª and has a height equal to the height of said rosette and is contained therein, completely filling the rosette. Upwardly from the plinth there projects a stubby column 46 having a cylindrical exterior of diameter substantially equal to the diameter of the crater 28ª and in initial stage of assembly, as shown at the left of FIGS. 3 and 5, projects above the inturned top edge 43 of the rosette 31ª. At the upwardly protruding end of stubby column 46, coaxial therewith, is a neck 47, also cylindrical and having a slightly less diameter than the column. Said plinth 45, column 46 and neck 47 are all integral with each other and have a common bore coaxially therein, said bore being provided with a plurality of convolutions 48 of a character conforming to the threads of the bolt or the like for use therewith.

It now is to be noted that a shoulder 49 is provided at the top of the plinth 45 around the bottom of column 46 and that the nut as originally fabricated also provides a narrow ledge 50 at the top of said column around the bottom of neck 47. The inwardly directed top edge 43 of the rosette 31ª is provided with irregularities, here shown as semi-circular notches 51. In effecting the unification of the nut 44 with the rosette 31ª the rosette is placed over and around the plinth 45 with the column 46 and neck 47 protruding through crater 28ª, and thereafter a suitable die D (see FIG. 5) is depressed around said neck onto the ledge 50, crimping the same onto the top of the rosette, as indicated at 52 at the right of FIGS. 3 and 5 as having been done, such crimping also forcing metal of the column 46 into the said irregularities 51 of the rosette. This unification operation is performed at the factory so that the device arrives in completely fabricated and assembled condition for use. The sectioned left-hand side of FIG. 5, and corresponding left-hand side of FIG. 3, show the nut and rosette before the above-described crimping operation has been performed.

Giving attention to the modification exemplified in FIGS. 4 and 6, the foregoing description applies with few exceptions. Here the nut 44ᵇ is shown with a square plinth 45ᵇ and with substantially vertical side edges, and the rosette 31ᵇ is correspondingly shaped. The square shape of rosette and plinth will fix the nut non-rotatably in the rosette, so that this shaping corresponds in its effect with the provision of the irregularities or notches 51 shown in FIGS. 3 and 5 to prevent rotation. As in those figures, also, the presently described modifications of nut 44ᵇ includes a stubby column 46 and neck 47, a series of screw-thread convolutions 48, a shoulder 49 and ledge 50. The rosette 31ᵇ provides an inturned edge 43ᵇ onto which metal from the column 46 may be crimped for unification of the rosette and nut, as at 52, as shown done at the right-hand side of FIGS. 4 and 6. The sectioned left-hand side of FIG. 6 and corresponding left-hand side of FIG. 4 show the nut and rosette before the said crimping operation has been performed.

Turning now to a consideration of Sheet 2 of the drawings, it may be observed initially that the rosette 31 there shown follows the pattern of the one described at length with respect to FIGS. 1 and 2, so that repetition of that description is not deemed necessary. Other portions of the retainers, however, differ somewhat, and will be treated individually in the following discussion, together with explanation of the retainers employed therewith.

Attention is therefore now directed to the modification illustrated in FIGS. 8 and 9, wherein a basal member 53 having a bolt-receiving hole 54 corresponding to the heretofore described basal member 22 and hole 24 are present. The receptacle 55, which again is fabricated from relatively thin flat spring steel tempered to generate and maintain resiliency, has a body 56 of generally annular configuration surrounding and integral with the rosette 31. The receptacle is furthermore in its entirety of elongated character in that diametrically opposed legs 57 project from two sides of said body in the plane thereof. In normal condition of said legs, the under faces thereof are in a common plane to each other and to said annular body 56 and are adapted to rest upon and be retained removably in stable flatwise engagement upon the upper face of basal member 53.

Basal member 53 has two retainers 58 with a spacing from each other at opposite sides of hole 54 agreeable to the spacing required to receive the toe ends of legs 57. One mode of providing the retainers is to strike them up as tabs of the full thickness of the plate or member 53 leaving the ends of the tabs that are most remote from each other, integral with and bending upwardly from the said member so as to form inclined risers 59 sloping upwardly at less than 90° from the member and inwardly toward each other, say at an angle of about 60° from the face of the member. The upper or free ends of said risers 59 are again bent from the plane of the riser at an angle less than 90°, in this instance at about 60°, into substantial parallelism to the top face of said member 53 to form at their under sides downwardly directed shoulders 60 at an elevation from the said upper face of said member commensurate with the thickness of the receptacle leg 57 so as to admit the toe end of said leg thereunder. Admission of the toe ends of the two legs under the shoulders 60 of the two retainers 58, is effected by rotation of said receptacle 55, introducing the said toe ends of the legs 57 sidewise toward the retainers in approach thereto, and according to the present showing, such approach is in a counter-clockwise direction.

A detent 61 is located in the path of rotation of each leg 57 at a position to stop the rotation of the respective leg upon arrival at completed underlying relation to said shoulder 60. An appropriate detent may be formed by striking the same up in the form of a pup-tent cam from the face of the member 53 at the edge of the cut-out 62 from which the retainer is struck. Another cam-shaped detent 63 effective at the other side of each leg is provided to deter reverse rotation of the receptacle after the legs are rotated to final assembled position under the shoulders. These last-mentioned reverse-preventing detents 63 are of cam formation inclined in the direction of approach of the legs, so that the legs may be flexed away from the proximate surface of member 53 and snap down into engagement again therewith when passing the crest of the detent cam incline, at which time the toe of the leg registers with the retainer.

It is necessary to manually depress the toe ends of the legs 57 so as to introduce them under shoulders 60 while the rosette 31 and portions of the legs adjacent thereto are being flexed upwardly due to climbing over the cam incline of the reverse-rotation-preventing detents 63. A suitable tool may be provided for effecting the simultaneous depression and rotation, and tool-receiving holes 64 are accordingly shown in FIGS. 8 and 9. The tool 71 shown in FIG. 11, may be used with the construction just described for applying the receptacle onto member 53. Removal of the receptacle 55 may be effected by simultaneously flexing the legs 57 upwardly to clear the reverse-rotation-preventing detents 63 and rotating the receptacle clockwise. For such removal operation and for effecting the releasing upward flexing and rotation of the receptacle, an appropriate tool may be provided (not shown) with a hub portion to engage and lift the rosette and adjacent ends of the legs, to cause said legs to over-ride the said reverse-rotation-preventing detents 63, while the tool, engaging the receptacle at holes 64 applies rotative impetus.

The modification of FIGS. 10, 11 and 14, provides a basal member 65 with retainers 66 stamped therefrom and of the same form and character as previously described retainers 58. In this form of the invention, the legs 67 tend to slope upwardly outward in normal condition, but may be flexed down to temporary position of engagement with the upper face of the basal member. The toe ends of the legs 67 have their side margins turned upwardly constituting detents 68 which will overlap the side edges of the retainers in normal position of said legs registering with shoulders 69 of the retainers 66. Said shoulders 69 are spaced adequately from the upper surface of basal member 65 to admit the toe ends of the legs 67 and the detents 68 thereon to pass under said shoulders for bringing said legs into assembled juxtaposition with said shoulders. The said leg have holes 70 therein to receive prongs of a tool 71 by which simultaneous downward flexing and rotation of the receptacle may be effected. Since the legs normally incline upwardly to the retainer shoulders, they will be detained by detents 68 from rotating until positively intentionally depressed.

In FIGS. 12 and 13, a basal member 72 again has retainers 73 stamped therefrom, but in this instance the cut-out 74 in the said member to provide the metal for the retainers, is wider than necessary for production of a shoulder 75, the extra width of metal being bent downwardly from said shoulder, thereby forming detents 76 at the sides thereof. The receptacle 77 provides legs 78 which normally slope upwardly outward, but may be flexed downwardly for introducing the toe ends thereof resiliently under the shoulder, after which it is permitted to flex upwardly toward its normal condition of slope to seat against said shoulder between the detents. Tool holes 79 are shown for receiving a suitable tool 71 such as the one illustrated in FIG. 11. In this modification the retainers 73, incorporating detents 76 therewith, prevent escape of the receptacle 77 from the basal member 72 in directions both axially and rotatively of the bolt-receiving rosette.

Irrespective of what element provides the detent, all showings herein provide a basal member having retainers for preventing escape of the receptacle in a direction of lifting therefrom, that is, in a direction axial to the threads, and also provide resilient legs constituted integral with the receptacle, and furthermore provide means operative in connection with said legs and member for restraining the receptacle from inadvertent lateral and rotative displacement.

I claim:

1. In combination, a first panel and a second panel both of any thickness encountered in industry, wherein said panels have faces to be juxtaposed and bolted flatwise together, and wherein said first panel has an exposed surface area on its opposite side from its said juxtaposed face, a bolt-receiving receptacle functioning as a nut mounted directly on and in surface contact with said surface area of the first panel, both of said panels were juxtaposed having bolt-holes registering one with the other, and a bolt projecting through the second panel into and through the first panel and directly into said receptacle contiguous thereat to said surface area of said first panel, and means for removably securing said receptacle directly on said surface area of the first panel and both prevent said receptacle from lifting off of said panel and from rotating thereon, said means comprising retainers integral with said first panel located entirely within the confines of said area inwardly from all edges thereof and radially outwardly from said bolt-hole, said retainers each having a shoulder offset above said surface area of said first panel from which the retainer is integrally formed, said shoulders being parallel to said surface area, said receptacle having a medial upwardly projecting threaded socket entirely above said first panel for receiving said bolt projecting therein from said bolt-hole, said receptacle having a substantially flat seating body above said surface area of the first panel extending radially outwardly from said socket at the bottom thereof and projecting on a common diameter to and under said retainer shoulders, said body on a diameter therethrough providing radially directed resilient legs above and flexible toward and from said first panel and of less width than said seating body, said first panel and legs both having means angularly disposed to said surface area providing positive cooperative direct interengagement of said legs with said first panel in a direction restraining the receptacle from inadvertent displacement in any lateral direction and locking said receptacle against rotation in either rotative direction.

2. In combination, a basal member and a receptacle to be releasably secured together with the receptacle superimposed on the top of said basal member, said member having a bolt hole with a planar area therearound at the top of said member and having means radially outwardly from said bolt hole offset at the top of said member from said planar area overlying part of and retaining said receptacle from being lifted from said member, and said receptacle having a medial upwardly projecting threaded socket the axis whereof is perpendicular to said planar area and substantially coaxial with said hole, said socket being located entirely above said member for receiving a bolt projecting therein from said bolt hole, said receptacle having a substantially flat seating body above said planar area of the member extending radially outwardly from said socket at the bottom thereof, said body providing radially directed normally unflexed resilient legs of inverted U-shape above said member of less width than said seating body, said basal member and legs both having means in a direction opposite to the direction of the closed end of the U and angularly disposed to said planar area providing positive cooperative inter-engagement with each other respectively both restraining the receptacle from inadvertent displacement in any lateral direction and locking said receptacle against rotation in either rotative direction, said receptacle being rotatable about said axis to and from said position of positive inter-engagement, and said legs being resiliently flexible from normal unflexed condition in approach to and departure from said position and effective in normal condition without flexure at said position to positively interengage with said member, said positive inter-engagement being releasable only by intentional manual flexing of said legs from said normal condition.

3. In combination, a basal member and a receptacle to be releasably secured together with the receptacle superimposed on the top of said basal member, said member having a bolt hole with a planar area therearound at the top of said member and having means radially outwardly from said bolt hole offset at the top of said member from said planar area overlying part of and retaining said receptacle from being lifted from said member, and said receptacle having a medial upwardly projecting threaded socket entirely above said member for receiving a bolt projecting therein from said bolt hole, said receptacle having a substantially flat seating body above said planar area of the member extending radially outwardly from said socket at the bottom thereof, said body providing radially directed resilient legs above said member of less width than said seating body, said legs terminating at their radially outward ends with transverse rectangular toes directed at all sides of each toe right angularly downward from its respective leg toward said member, and said member having cooperating four-sided rectangular slits conforming to and receiving said toes, thereby providing positive cooperative inter-engagement with each other respectively, both restraining the receptacle from inadvertant displacement in any lateral direction and locking said receptacle against rotation in either rotative direction.

4. In combination, a basal member and a receptacle to be releasably secured together with the receptacle superimposed on the top of said basal member, said member having a bolt hole with a planar area therearound at the top of said member and having means radially outwardly from said bolt hole offset at the top of said member from said planar area overlying part of and retaining said receptacle from being lifted from said member, and said receptacle having a medial upwardly projecting threaded socket entirely above said member for receiving a bolt projecting therein from said bolt hole, said receptacle having a substantially flat seating body above said planar area of the member extending radially outwardly from said socket at the bottom thereof, said body providing radially directed resilient legs above said member of less width than said seating body, said legs being integral with said body at their radially inward ends and terminating at their radially outward ends with transverse rectangular toes directed at all sides of each toe right angularly downward from its respective leg toward said member, each said leg intermediate of said ends thereof having an inverted U-shaped knee bend upwardly away from said basal member but with the leg making contact with said member at each end of said knee bend between the knee bend and the respective end of the leg, and said member having cooperating four-sided rectangular slits conforming to and receiving said toes thereby providing positive cooperative inter-engagement with each other respectively, both restraining the receptacle from inadvertent displacement in any lateral direction and locking said receptacle against rotation in either rotative direction.

5. In combination, a basal member and a receptacle to be releasably secured together with the receptacle superimposed on the top of said basal member, said member having a bolt hole with a planar area therearound at the top of said member, and said receptacle having a medial upwardly projecting threaded socket entirely above said member for receiving a bolt projecting therein from said hole, said receptacle having a substantially flat seating body above said planar area extending radially outwardly from said socket at the bottom thereof, said body providing diametrically thereof two outwardly directed normally substantially flat resilient legs flatwise above and juxtaposed on said member, each of said legs being of less width than said seating body and integral therewith and each having a toe end remote from said socket, said basal member providing two retainers having shoulders spaced above the said planar area and having their free ends extending toward the hole of the basal member whereby to receive the toe ends of said legs thereunder, said member having limiting detents at both sides of at least one of said legs at the same side of said hole as the respective leg and at position of said legs when the toes thereof are under the retainers, approach side of one of said detents being formed as an inclined cam over which the leg may be caused to ride and be flexed to snap between the detents when in position of use with the toe end of the leg under its respective retainer, subsequent release of the receptacle requiring said leg to be flexed manually to surmount the detent to permit rotation of the toe end from under said retainer.

6. In combination, a basal member and a receptacle to be releasably secured together with the receptacle superimposed on the top of said basal member, said member having a bolt hole with a planar area therearound at the top of said member and said receptacle having a medial upwardly projecting threaded socket entirely above said member for receiving a bolt projecting therein from said bolt hole, said receptacle having a substantially flat seating body above said planar area extending radially outwardly from said socket at the bottom thereof, said body providing diametrically thereof two outwardly directed normally substantially flat resilient legs sloping outwardly upwardly above said member, said legs having less width than said seating body and each having one end integral therewith and each having a toe end remote from said socket, said basal member providing two retainers offset upwardly from said planar area thereby providing shoulders integrally connected to and spaced above said planar area and with free ends extending toward the hole agreeable to spacing required to receive the toe ends of said legs thereunder whereby said shoulders overlie the toe ends of the legs, said retainers having limiting detents projecting downwardly at both sides of said retainers toward said planar area and spaced therefrom to permit entry of said legs under said detents to lodge resiliently between said detents under said retainers, subsequent release of the receptacle requiring said legs to be flexed manually to escape deterring detent to permit rotation of the toe ends of the legs from under said retainer.

7. In combination, a basal member and a receptacle to be releasably secured together with the receptacle superimposed on the top of said basal member, said member having a bolt hole with a planar area therearound at the top of said member and said receptacle having a medial upwardly projecting threaded socket entirely above said member for receiving a bolt projecting therein from said bolt hole, said receptacle having a substantially flat seating body above said planar area extending radially outwardly from said socket at the bottom thereof, said body providing diametrically thereof two outwardly directed normally substantially flat resilient legs sloping outwardly upwardly above said member, said legs having less width than said seating body and each having one end integral therewith and each having a toe end remote from said socket, said basal member providing two retainers offset upwardly from said planar area and located at opposite sides of said hole agreeable to spacing required to receive the toe ends of said legs thereunder, said toe ends of the legs having limiting detents integral with and projecting upwardly at both sides of said legs and spaced in pairs at each toe end to engage at opposite sides of said retainers at position of said legs when the toes thereof are under said retainers, subsequent release of the receptacle requiring said legs to be flexed manually toward the planar area to depress the detents to position lower than the retainers and permit rotation of the toe ends from under said retainers.

References Cited by the Examiner
UNITED STATES PATENTS

| | | | |
|---|---|---|---|
| 2,144,553 | 1/1939 | Simmonds | 151—41.76 |
| 2,156,002 | 4/1939 | Tinnerman. | |
| 2,213,924 | 9/1940 | Tinnerman | 151—41.75 |
| 2,273,648 | 2/1942 | Kost | 151—41.75 |
| 2,381,233 | 8/1945 | Summers | 151—41.71 |
| 2,513,037 | 6/1950 | McLaughlin | 151—41.75 |
| 2,748,825 | 6/1956 | Launay | 151—41.75 |
| 2,825,380 | 3/1958 | Reimer | 151—41.76 |
| 2,948,316 | 8/1960 | Sing et al. | 151—41.7 |

EDWARD C. ALLEN, *Primary Examiner.*